United States Patent [19]

Chiarva

[11] Patent Number: 4,765,255
[45] Date of Patent: Aug. 23, 1988

[54] PERFECTED SYSTEM FOR PYROLYSING AND/OR DRYING BIOLOGICAL SLUDGE OR SIMILAR

[75] Inventor: Giorgio Chiarva, Cuneo, Italy
[73] Assignee: Stella S.p.A., Cuneo, Italy
[21] Appl. No.: 127,950
[22] Filed: Dec. 2, 1987
[51] Int. Cl.⁴ .................. B23K 3/02; B44B 7/02; F23D 14/00
[52] U.S. Cl. .................. 110/226; 34/108; 110/229; 110/246; 432/103
[58] Field of Search .......... 110/226, 246, 229; 432/103; 248/130; 34/108; 266/173

[56] References Cited

U.S. PATENT DOCUMENTS

| | | | |
|---|---|---|---|
| 4,084,521 | 4/1978 | Herbold et al. | 110/242 |
| 4,205,613 | 6/1980 | Fio Rito et al. | 110/226 X |
| 4,361,100 | 11/1982 | Hinger | 110/226 X |
| 4,696,116 | 9/1987 | Livingston | 34/108 |

Primary Examiner—Edward G. Favors
Attorney, Agent, or Firm—Pearne, Gordon, McCoy & Granger

[57] ABSTRACT

A system for pyrolysing/drying biological sludge by indirectly heating the same by means of hot fumes, characterized by the fact that it incorporates a rotary furnace secured angularly to a cover skirt and defining, with the same, a cavity in which to circulate the aforementioned heating fumes; the aforementioned skirt being supported in rotary manner on powered rollers and connection to the utility pipes and to the sludge loading/unloading means fixed to the floor being made by means of devices consisting of a first frame turning together with the furnace and the respective skirt and supporting, in idle manner by means of rolling bodies, and a second frame connected to the aforementioned pipes.

7 Claims, 3 Drawing Sheets

PERFECTED SYSTEM FOR PYROLYSING AND/OR DRYING BIOLOGICAL SLUDGE OR SIMILAR

BACKGROUND OF THE INVENTION

The present invention relates to a pyrolysis/drying system, particularly for pyrolysing/drying biological sludge, on which the material is heated indirectly by means of hot fumes inside a rotary furnace through which the material is fed in a continuous stream.

On pyrolysis/drying systems currently available on the market, the material is known to be processed mainly by direct heating. When the consistency of the material being processed is such that continuous processing requires the use of a rotary furnace, direct heating is the only economical solution from the systems standpoint, even in cases where, from the purely processing standpoint, indirect heating would be preferable, e.g. to prevent ruining the material and/or for enabling the recovery of any gases given off by the same. Indirect heating, however, involves too great an outlay in terms of connecting devices between the furnace and the rest of the system, due to the difficulty encountered in ensuring the necessary sealing of mutually mobile fittings.

SUMMARY OF THE INVENTION

The aim of the present invention is to provide a pyrolysis/drying system, particularly for pyrolysing/drying biological sludge, whereby the material is heated indirectly and continuously by means of hot fumes inside a rotary furnace, and which is designed to overcome the aforementioned drawbacks, i.e. a system enabling low-cost connection of the furnace to the rest of the system, while at the same time ensuring optimum sealing, even in the presence of mutually mobile fittings.

With this aim in view, according to the present invention, there is provided a pyrolysis and/or drying system, particularly for pyrolysing and/or drying biological sludge, which system comprises a fluidtight furnace into which the material is fed continuously at a first end and from which it is unloaded continuously at a second end by respective loading/unloading means; and a cylindrical skirt externally enclosing the said furnace in fluidtight manner and defining, together with an outer lateral surface of the same, an annular cavity along which may be fed a stream of hot burnt gases supplied by a first pipe at one end of the said skirt and exhausted by a second pipe at the opposite end of the said skirt; characterised by the fact that the said furnace and the said skirt are connected angularly integral, and are mounted, in such a manner as to turn concentrically, on respective roller supports outside the said skirt; the said loading/unloading means and the said first and second pipes being fixed in relation to the said roller supports, and being connected to the respective said ends of the said furnace and the said skirt by means of respective devices, each comprising a first frame fixed angularly integral with the said skirt, a second frame fixed in relation to the said roller supports, and a number of rolling bodies inserted between the said first and said second frame in such a manner as to enable mutual rotation of the same; the said first frame being radially outermost, in relation to the axis of the said skirt, as compared with the said second frame, in such a manner as to support the said second frame by means of the said rolling bodies; the inside of the said furnace and the said cavity being connected in fluidtight manner to the inside of the said second frame by means of respective concentric connecting pipes coaxial with the common rotation axis of the said furnace and the said skirt, and cooperating with respective sliding seals on the said second frame.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
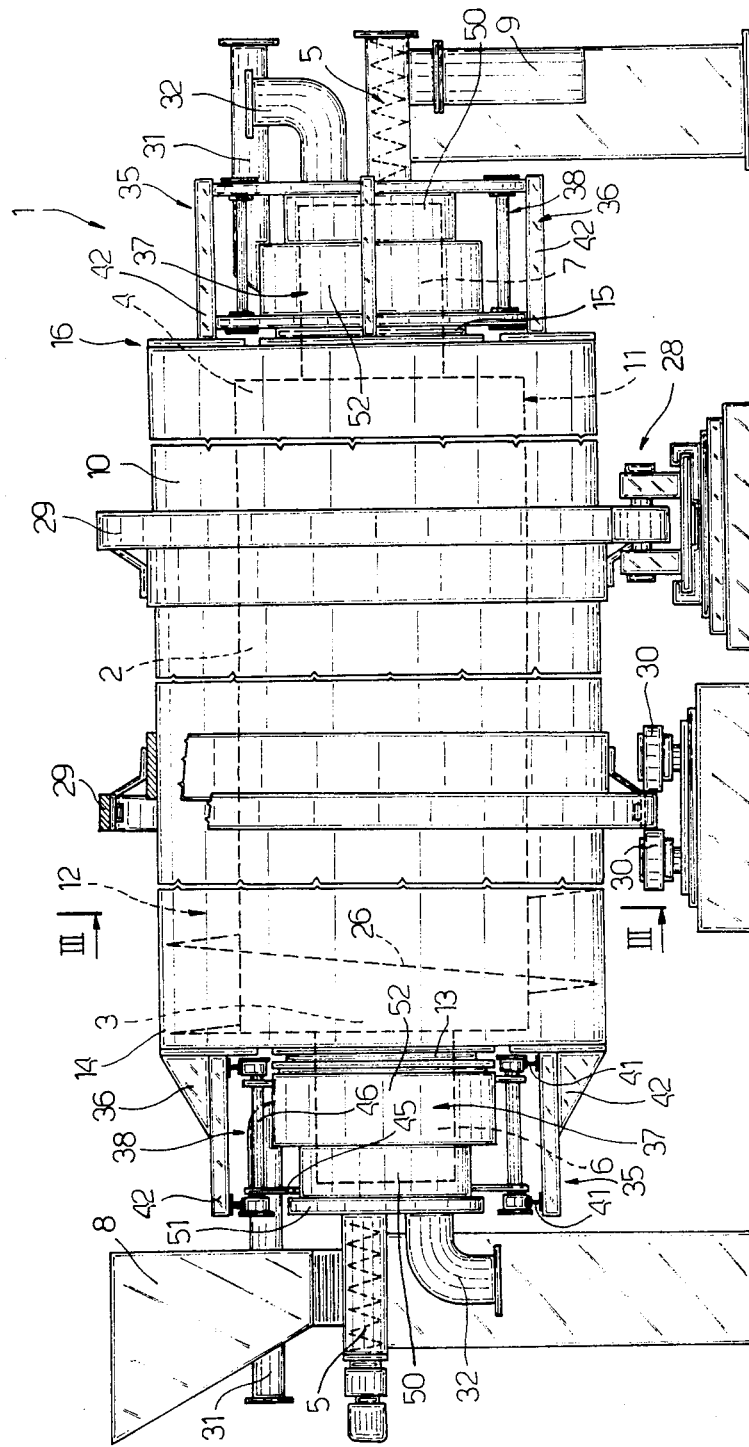
FIG. 1 shows a longitudinal view of a pyrolysis system in accordance with the teachings of the present invention, and illustrated only partly for the sake of simplicity.

Number 1 in the accompanying drawings indicates an indirectly-heated pyrolysis/drying system for biological sludge or similar. System 1 is composed mainly of a fluid-tight rotary furnace 2 into which the unprocessed material is fed continuously at a first end 3 and unloaded continuously at a second opposite end 4 by respective loading/unloading means consisting of respective screws 5 of any known type located next to respective pipes 6 and 7 connecting the said ends 3 and 4 to the rest of system 1, and catered for respectively and in fluidtight manner by an unprocessed sludge feedbox 8 and a pyrolysed sludge unloading bin 9; and a cylindrical skirt 10 externally enclosing the said furnace 2 in fluidtight manner and defining, with a cylindrical outer lateral surface 11 of the same, an annular cavity 12 along which may be fed a stream of hot burnt gases, as shown by the arrows in FIG. 2, supplied by a further connecting pipe 13 at end 14 of skirt 10 and exhausted by a second connecting pipe 15 at the opposite end 16 of the said skirt 10. Pipes 13 and 15 are coaxial and concentric with respective pipes 6 and 7 which, being smaller in diameter, are housed inside the said pipes 13 and 15. In more detail, and as shown in FIG. 2, at ends 3 and 14, which are identical to ends 4 and 16 which are therefore not described in detail, pipes 6, 7 and 13, 15 are substantially much smaller in diameter than skirt 10 and furnace 2, which is also cylindrical, and are secured so as to project axially from the respective ends of skirt 10; pipes 6, 7 being secured directly against respective plates 18 closing the respective ends of furnace 2, and over respective holes 19 formed in the same, and pipes 13, 15 being secured directly against respective plates 20 closing the respective ends of skirt 10, and over respective holes 21 in the same.

Pipes 13, 15 are also connected structurally to respective pipes 6, 7 by means of radial strengthening elements 22, and plates 20 also act as connecting elements between furnace 2 and coaxial skirt 10 which, according to the present invention, are therefore connected angularly integral with each other. For example, plates 20 are connected to plates 18 by means of screws 23 and to skirt 10 by means of fasteners 24 and respective screws 25. For its own support on furnace 2, skirt 10 rests on a set of known radial fins 26, as shown by the dotted line, located outside furnace 2 and consisting of a continuous element wound integrally about wall 11 and defining, with the same, a heat-exchange surface facing the said annular cavity 12.

According to the present invention, furnace 2 is rotated by rotating skirt 10 which, with furnace 2 housed concentrically inside it, is mounted for rotation on known external roller supports 28. The rollers of supports 28 are preferably powered, so as to transmit rotary motion by friction to skirt 10 and connected furnace 2 via respective known supporting wheels 29 fitted externally integral with skirt 10. Further rollers 30, designed to engage frontally with one of wheels 29, provide for axially locking the skirt/furnace assembly on to supports 28. Skirt 10 could, however, also be rotated by a crown gear and pinion. In addition to screws 5, the rest of system 1 consists of known units (not shown) for respectively producing the said stream of hot gases fed into cavity 12, and for drawing off and possibly also processing the gases produced during pyrolysis or drying of the sludge inside furnace 2. The said units and a chimney for exhausting the heating gases are connected by respective pairs of pipes 31 and 32 at each end of skirt 10. Unlike skirt 10 and furnace 2, which are mounted for rotation, the said pipes 31 and 32, and also screws 5, are fixed in relation to supports 28. According to the present invention, the said skirt 10 and furnace 2 are connected to pipes 31 and 32, when provided, and to screws 5 by means of respective identical devices 35 (only one of which is described) located at ends 3, 14 and 4, 16.

Figure 2:
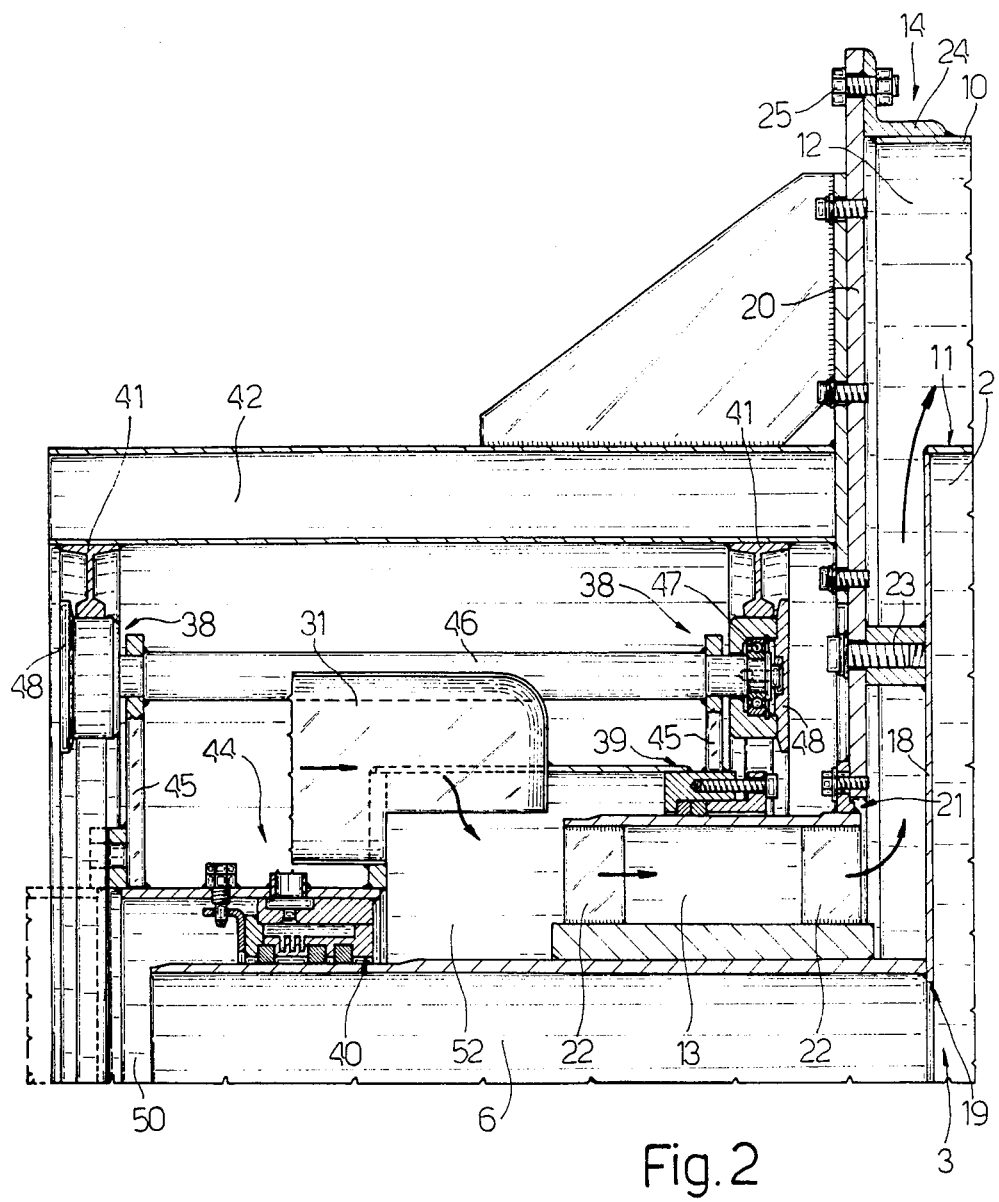
FIG. 2 shows a larger-scale section of a detail on the FIG. 1 system.
Figure 3:
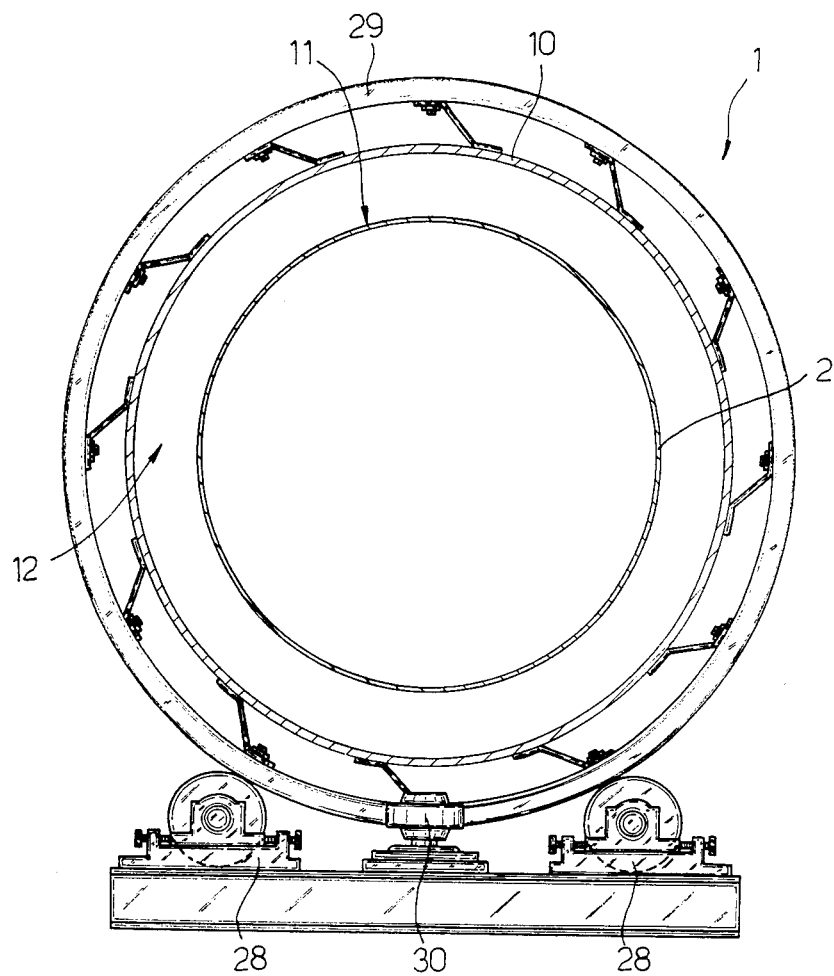
FIG. 3 shows a section along line III—III of the FIG. 1 system.

As shown in FIG. 2, each device 35 comprises a first frame 36 secured angularly integral with skirt 10, a second frame 37 fixed in relation to supports 28, and a number of rolling bodies 38 inserted between the said frames 36 and 37 for enabling mutual rotation of the same. In relation to the axis of skirt 10, frame 36 is radially outermost as compared with frame 37, in such a manner as to support the said frame 37 by means of the said rolling bodies 38, and the inside of furnace 2 and cavity 12 are connected in fluidtight manner to the inside of frame 37 by means of respective pipes 6 and 13 and respective sliding seals 39 and 40 supported integrally on frame 37 and cooperating with the outer surface of pipes 6 and 13 which, obviously, turn integral with respective furnace 2 and skirt 10. In more detail, frame 36 comprises a pair of annular rails 41 mounted on respective supports 42 projecting axially from the respective ends of skirt 10. Frame 37, on the other hand, comprises a bell 44 fitted on to pipes 6, 13 by means of the said seals 39, 40, and a number of pairs of radial arms 45 secured in projecting manner and externally integral with bell 44 and supporting respective integral rods 46 parallel with the rotation axis of furnace 2 and skirt 10 and having, on their opposite ends, the said rolling bodies 38 consisting of respective rollers mounted in idle maner on rods 46 by means of bearings 47, and engaged so as to roll along rails 41. On opposite sides, rollers 38 also present removable axial shoulders consisting of discs 48, which cooperate frontally with rails 41 and also act as covers for the housings of bearings 47 formed inside rollers 38. The said bell 44 comprises a first smaller-diameter cylindrical portion 50, which is closed on its free end by a plate 51 supporting intake pipe 32 and respective screw 5, and which is fitted on to the free end of pipe 6 via the interposition of sealing assembly 40; and a second larger-diameter portion 52 which projects from said portion 50 on the opposite side to plate 51, is fitted on to the free end of respective pipe 13 via the interposition of sealing assembly 39, and from which respective pipe 31 projects laterally. Sealing assemblies 39 and 40 are of known type. Whereas sealing assembly 39, which is subjected to les stress and therefore simpler in design, isolates the inside of bell 44 from the outside atmosphere, sealing assembly 40, which is designed to operate under high-temperature conditions, provides for separating in fluid-tight manner the two portions 50 and 52 of bell 44. Consequently, in actual use, the hot fumes fed along one of pipes 31 and drawn off by the other are fed into portion 52 of each bell 44 where, being prevented from reaching the outside by seal 39, or passing into portion 50 by seal 40, they are channeled into respective connecting pipe 13 and in and out of cavity 12. In like manner, the material inside furnace 2 is heated indirectly by the said fumes, via surface 11 and fins 26. On the other hand, the gases produced inside furnace 2, by breaking down and/or drying the material fed through the furnace by screws 5, come out through pipe/s 6 (if provided at both ends 3, 4) and, by virtue of pipe 6 being longer than respective pipe 13 and isolated from the same by means of seal 40, flow into portions 50 of bells 44 where they may be drawn off through pipes 32, and, for example, burnt to produce some or all of the hot fumes fed into cavity 12, thus rendering system 1 substantially self-sufficient thermally. By virtue of the structure described, pipes 6 obviously provide for loading and unloading the material from furnace 2, for which purpose, screws 5 need simply be located facing the inlets of the said pipes 6.

From the foregoing description, devices 35 clearly provide an effective, low-cost solution to the sealing problems otherwise encountered on a system of the aforementioned type, and which would render indirect heating either unfeasible or uneconomical, due to the high energy comsumption involved. To those skilled in the art it will be clear that changes may be made to the system as described and illustrated herein without, however, departing from the scope of the present invention.

I claim:

1. A pyrolysis and/or drying system (1), particularly for pyrolysing and/or drying biological sludge, which system (1) comprises a fluidtight furnace (2) into which the material is fed continuously at a first end and from which it is unloaded continuously at a second end by respective loading/unloading means (5); and a cylindrical skirt (10) externally enclosing the said furnace (2) in fluidtight manner and defining, together with an outer lateral surface (11) of the same, an annular cavity (12) along which may be fed a stream of hot burnt gases supplied by a first pipe (31) at one end (14) of the said skirt (10) and exhausted by a second pipe (31) at the opposite end (16) of the said skirt (10); characterised by the fact that the said furnace (2) and the said skirt (10) are connected angularly integral, and are mounted, in such a manner as to turn concentrically, on respective roller supports (28) outside the said skirt (10); the said loading/unloading means (5) and the said first and second pipes (31) being fixed in relation to the said roller supports (28), and being connected to the respective said ends of the said furnace (2) and the said skirt (10) by means of respective devices (35), each comprising a first frame (36) fixed angularly integral with the said skirt (10), a second frame (37) fixed in relation to the said roller supports (28), and a number of rolling bodies (38) inserted between the said first and said second frame (36, 37) in such a manner as to enable mutual rotation of the same; the said first frame (36) being radially outermost, in relation to the axis of the said skirt (10), as compared with the said second frame (37), in such a manner as to support the said second frame (37) by means of the said rolling bodies (38); the inside of the said furnace (2) and the said cavity (12) being connected in fluidtight manner to the inside of the said second frame (37) by means of respective concentric connecting pipes (6, 13) coaxial with the common rotation axis of the said furnace (2) and the said skirt (10), and cooperating with respective sliding seals (39, 40) on the said second frame (37).

2. A system as claimed in claim 1, characterised by the fact that the said concentric pipes (6, 13) are substantially much smaller in diameter than the said skirt (10) and the said furnace (2), which is also cylindrical, and are secured so as to project axially in relation to the respective end of the said skirt; a first pipe (6) being secured directly against a plate (18) closing the respective end of the said furnace (2), and over a respective hole (19) in the same; and a second (13) being secured directly against a plate (20) closing the respective end of the said skirt (10), and over a respective hole (21) in the same.

3. A system as claimed in claim 2, characterised by the fact that the said furnace (2) and the said skirt (10) are connected by means of the said plates (20) closing the respective ends of the said skirt (10); the said skirt (10) also being supported by a set of radial fins (26) on the outside of the said furnace (2) and consisting of a continuous element wound about and integral with the said lateral wall (11) of the said furnace (2).

4. A system as claimed in claim 1, characterised by the fact that the said loading/unloading means consist of respective screws (5), each supported on a second frame (37) next to the respective said pipe (6) connecting each end of the said furnace (2), and catered for in fluidtight manner by a feedbox (8) and unloading bin (9) respectively.

5. A system as claimed in claim 1, characterised by the fact that each said first frame (36) comprises a pair of annular rails (41) mounted on respective supports (42) projecting axially from the respective said ends of the said skirt (10).

6. A system as claimed in claim 5, characterised by the fact that each said second frame (37) comprises a bell (44) fitted on to the said pipes (6, 13) connecting the said furnace (2) and the said cavity (12) by means of the said sliding seals (39, 40); and a number of pairs of radial arms (45) externally integral with the said bell (44) and supporting respective integral rods (46) parallel with the rotation axis of the said furnace (2) and the said skirt (10) and having, on their opposite ends, respective idle rollers (38) engaging with the said annular rails (41) and having removable axial shoulders (48) cooperating with the said rails (41).

7. A system as claimed in claim 6, characterised by the fact that the said bell (44) comprises a first smaller-diameter cylindrical portion (50) which is closed at one end by a plate (51) supporting means (32) for drawing off the gases produced inside the said furnace (2) and the said loading/unloading means (5), and which, at the other end, is fitted on to a said pipe (6) connecting the said furnace (2); and a second larger-diameter portion (52) projecting from the said first portion (50) on the opposite side to the said plate (51), and fitted on to the respective said pipe (13) connecting the said cavity (12).

* * * * *